United States Patent
Miller

[15] 3,706,220
[45] Dec. 19, 1972

[54] DENSITOMETER
[72] Inventor: Charles Eveleigh Miller, Boulder, Colo.
[73] Assignee: International Telephone and Telegraph Corporation, New York, N.Y.
[22] Filed: March 11, 1971
[21] Appl. No.: 123,254

[52] U.S. Cl. .................................................. 73/32
[51] Int. Cl. ............................................. G01n 9/00
[58] Field of Search....73/32, 30, 67.2, 194 B, 194 M

[56] References Cited

UNITED STATES PATENTS 3,295,360  1/1967  Dimeff .................................... 73/30

Primary Examiner—James J. Gill
Attorney—C. Cornell Remsen, Jr., Walter J. Baum, Paul W. Hemminger, Charles L. Johnson, Jr. and Thomas E. Kristofferson

[57] ABSTRACT

A temperature insensitive vibration densitometer utilizing a thin vibrating vane of Ni Span C, a first cylinder of 416 stainless steel to carry the vane, and a second cylinder outside the first. An interference fit exists between cylinders. The second cylinder is also made of Ni Span C. When the second cylinder thickness is about equal to or somewhat less than that of the first cylinder, the instrument is practically temperature insensitive. The 416 stainless steel has a thermal coefficient of expansion greater than that of the Ni Span C. Even though the relationship of the densitometer resonant frequency to temperature is extremely difficult to analyze, the necessary correction can be made as aforesaid. The invention thus overcame a difficult problem.

2 Claims, 8 Drawing Figures

PATENTED DEC 19 1972
3,706,220
SHEET 1 OF 2
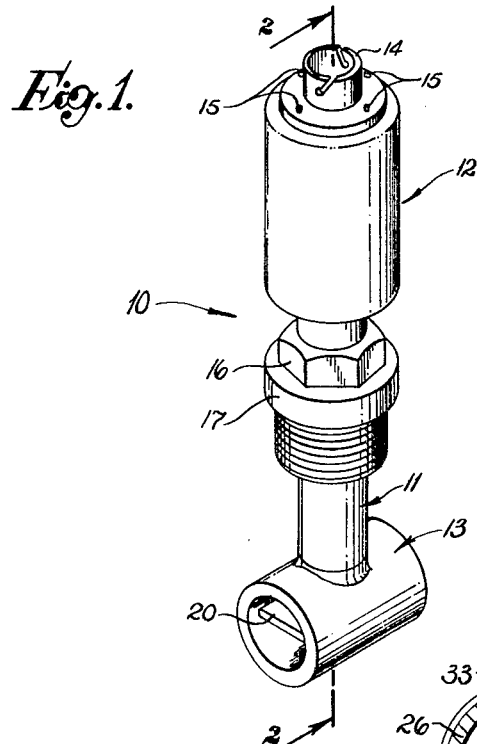
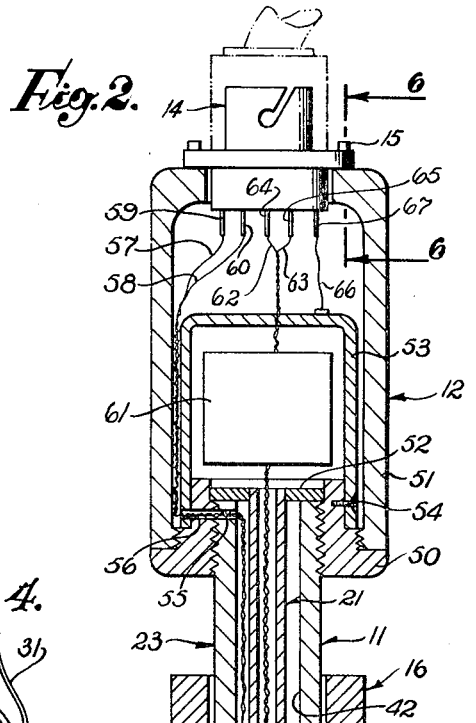
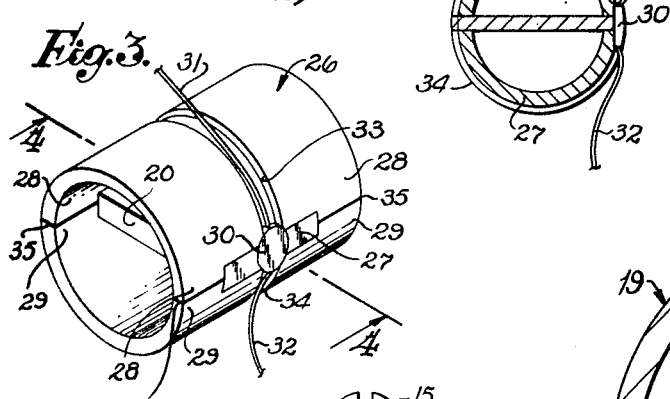
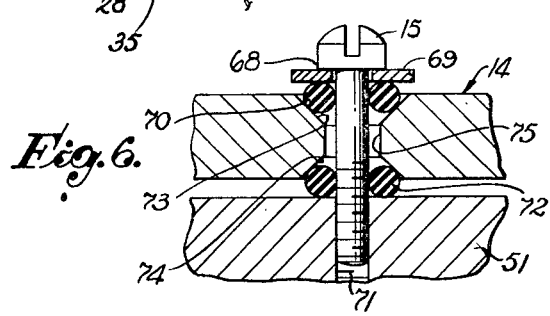
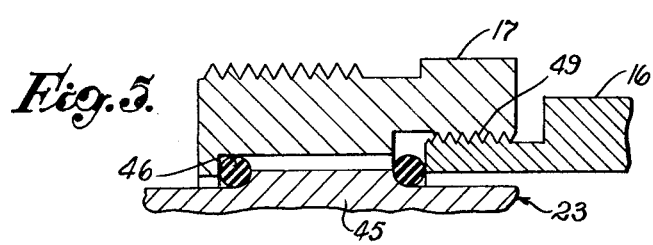
INVENTOR.
CHARLES E. MILLER
BY
ATTORNEY.

INVENTOR.
CHARLES E. MILLER
ATTORNEY

DENSITOMETER

BACKGROUND OF THE INVENTION

This invention relates to devices for producing an electrical signal in accordance with the density of a fluid, and more particularly, to a temperature insensitive vibration densitometer.

Although the invention will have applications other than those referred to herein, vibration densitometers are especially sensitive to changes in temperature, and the present invention solves this problem.

Vibration densitometers are, in effect, electromechanical resonators. The resonant frequency of such a device is a function of the density of a fluid, gas or liquid, in which they are immersed. However, especially in gas densitometers, the resonant frequency changes with temperature as well as with density. An error is thus created.

The cause of the error is very, very difficult to analyze because the casual connection between frequency and temperature is not apparent.

Normally, it would be expected that the least possible error would be created by using the same material for all of the parts to prevent deformation. However, this does not work.

SUMMARY OF THE INVENTION

In accordance with the device of the present invention, the above-described and other disadvantages of the prior art are overcome by providing a member to be vibrated in a densitometer, and a structure to support the member, the structure having a thermal coefficient of expansion greater than that of the member.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a perspective view of a vibration densitometer probe;

FIG. 2 is a sectional view of the probe taken on the line 2—2 shown in FIG. 1;

FIG. 3 is a perspective view of a group of component parts of the probe shown in FIG. 1;

FIG. 4 is a transverse sectional view of the assembly taken on the line 4—4 shown in FIG. 3;

FIG. 5 is an enlarged longitudinal sectional view of a portion of the probe shown in FIG. 1;

FIG. 6 is a longitudinal sectional view of a portion of mounting means for an electrical connector otherwise substantially fixed relative to the probe taken on the line 6—6 shown in FIG. 2;

DESCRIPTION OF THE PREFERRED EMBODIMENTS

Figure 7:
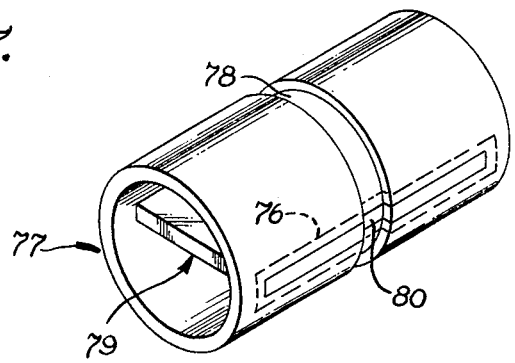
FIG. 7 is a perspective view of an alternative embodiment of the invention.

FIGS. 1 to 7, inclusive are identical to those shown in copending application Ser. No. 65,371 filed Aug. 20, 1970, by C. E. Miller and G. L. Schlatter for DENSITOMETER.

In FIG. 1, a vibration densitometer probe is indicated at 10 having a shank 11, a housing 12 at its upper end, a tubular assembly 13 at its lower end, and an electrical connector assembly 14 at the upper end of housing 12 fixed thereto by bolts 15. Annular fittings 16 and 17 extend around shank 11 for mounting probe 10 in a hollow cylindrical extension 18 of a pipeline 19, as shown in FIG. 2.

As shown in FIG. 1 and 2, a stainless steel vane 20 is mounted in assembly 13 in a position perpendicular to the axis of a hollow cylindrical magnetostrictive inner tube 21. Vane 20, if desired, may be also mounted in a symmetrical position with respect to the axis of an outer sleeve 22 which houses it.

Vane 20 may be a rectangular plate having flat and parallel upper and lower surfaces as shown in FIG. 2, and may otherwise have mutually normal surfaces forming a right parallelopiped.

Shank 11 not only includes inner tube 21, but an outer magnetic tube 23. A driver coil or solenoid winding 24 wound on a nylon bobbin 25 is press fit onto the external surface of inner tube 21 and located in a space between the tubes 21 and 23 toward the lower end of shank 11. Coil 24 is thus maintained in a substantially fixed position on inner tube 21, although the same is not necessarily critical to the operation of the device of the present invention.

Vane 20 is supported between two half cylinders 26 and 27 as shown in FIGS. 2 and 3. The longitudinal edges of vane 20 are pressed together between half cylinders 26 and 27 with a pressure of, for example, 20,000 pounds per square inch because the assembly shown in FIG. 3 is inserted in sleeve 22 with an interference fit, sleeve 22 being heated prior to the said insertion.

Half cylinder 26 has four projections 28, and half cylinder 27 has four projections 29. Projections 28 and 29 serve to prevent longitudinal movement of vane 20 between half cylinder 26 and half cylinder 27 although the same is not likely due to the clamping pressure on vane 20 between half cylinder 26 and half cylinder 27.

Half cylinders 26 and 27, and vane 20 may be machined to have a flat or recess to receive a piezoelectric crystal 30. Crystal 30 has electrical leads 31 and 32 which extend around half cylinders 26 and 27 in grooves 33 and 34, respectively, to a point where they enter the hollow interior of inner tube 21. This entry is made at the lower end of inner tube 21, as shown in FIG. 2.

As shown in FIG. 3, projections 28 and 29 may have a slight separation at 35 to insure that the pressure contact of half cylinders 26 and 27 on vane 20 is quite high due to the said interference fit.

As shown in FIG. 2, a boss 36 is welded at 27 to sleeve 13 in a fluid tight manner. Although the device of the present invention need not always be fluid tight throughout, a glass-to-metal seal or other seal may be provided inside inner tube 21 for leads 31 and 32. Before the said interference fit is provided, if desired, crystals 30, and those portions of leads 31 and 32 in grooves 33 and 34, respectively, may be potted with an epoxy. Further, after the interference fit has been effected, the entire unit when completely assembled may be treated further by applying a bonding agent around all of the structures inside sleeve 22. Any conventional bonding process may be employed including, but not limited to, the application of a bonding agent sold under the name of "Locktile."

As stated previously, boss 36 may be welded to sleeve 22 at 37 in a fluid tight manner. Further, outer tube 23 may be threaded onto boss 36 and welded thereto at 38 in a fluid tight manner. For all practical purposes, boss 36 may thus be considered an integral part of outer tube 23. Boss 36, for example, is also made of a magnetic material. All of the "magnetic materials" referred to herein may be any magnetic material including, but not limited to, stainless steel. However, inner tube 21, although being magnetic, must also be magnetostrictive. Notwithstanding this limitation, it is to be noted that inner tube 21 is employed to produce vibration, and if one feature of the present invention is used without another, the use of a magnetostrictive or magnetic material may not be required, and the invention still practiced.

Inner tube 21 has an annular projection 39 with a shoulder 40. Outer tube 23 has a lower bore 41 separated from a smaller upper counter bore 42 by an annular shoulder 43. Shoulder 40 and 43 abut. From shoulder 40 to the lower end of inner tube 21, inner tube 21 is always in axial compression. That is, inner tube 21 is in compression when coil 24 is energized, but inner tube 21 is also in compression when coil 24 is deenergized. Coil 24 is energized with an alternating current which thus merely changes the degree of compression of inner tube 21.

Projection 39 has a hole 44 through which the electrical leads of coil 24 can pass from the location of coil 24 upwardly between tubes 21 and 23.

The manner in which probe 10 is mounted in pipeline 19 is better illustrated in FIG. 5. In FIG. 5, note will be taken that outer tube 23 has an outwardly extending radial projection 45 on each side of which rubber O-rings 46 and 47 are compressed by fittings 16 and 17. Fitting 17 is threaded into extension 18 and sealed thereto by a conventional sealing compound 48 shown in FIG. 2. In FIG. 5, note will be taken that fitting 16 is threaded inside fitting 17 at 49. The amount O-rings 46 and 47 are compressed is, therefore, determined by the position of fitting 16. That is, fitting 16 is turned, for example, by a wrench, until the desired O-ring compression is reached.

From the construction illustrated in FIG. 5, note will be taken that only O-rings 46 and 47 contact outer tube 23, and that, therefore, shank 11 is never touched by either fitting 16 or fitting 17.

The leads from coil 24 are kept magnetically separate from the leads from crystal 30. This is true through a portion of housing 12 as will be described. Housing 12 has a fitting 50 threaded onto outer tube 23. A cylinder 51 is threaded to fitting 50. A washer 52 is press fit and thereby fixed in fitting 50 and inner tube 21. Inner tube 21 has an upper end which may be fixed relative to or slidable in washer 52, as desired. However, preferably the external surface of inner tube 21 at its upper end fits contiguous or in contact with the surface of washer 52 defining the hole therethrough. A shield 53 made of a magnetic material may be fixed around fitting 50 by one or two or more screws 54. Outer tube 23 has a radial hole 55 therethrough through which the leads from coil 24 pass. Fitting 50 has a hole 56 therethrough in alignment with hole 55 through which the leads from coil 24 pass. From the outward radial extremity of hole 56, the coil leads indicated at 57 and 58 pass upwardly between cylinders 51 and shield 53 and are connected to pins 59 and 60 of the electrical connector 14. Electrical connector 14 may be a conventional five-pin connector.

As stated previously, the leads 31 and 32 from crystal 30 extend upwardly through the interior of inner tube 21. At the upper end of the inner tube 21, as shown in FIG. 2, leads 31 and 32 are connected to the input of differential amplifier 61. Leads 31 and 32 thus extend outwardly through the upper opening in inner tube 21.

Differential amplifier 61 may be entirely conventional, and mounted on a conventional card, if desired. Amplifier 61 may be supported inside shield 53 by any conventional means, if desired, or simply supported by the strength of leads 31 and 32, and output leads 62 and 63 which are connected to pins 64 and 65 of connector 14, respectively. A lead 66 provides a ground connection from shield 53 to the fifth pin 67 of connector 14.

The manner in which connector 14 is mounted on cylinder 51 is shown in FIG. 6. Only one bolt 15 is shown in FIG. 6 since all bolts 15 are similarly situated. In FIG. 6, bolt 15 is shown having a head 68, a washer 69 under head 68, an O-ring 70 under washer 69, and a shank 71 threaded into cylinder 51. A second O-ring 72 also extends around screw shank 71. O-ring 70 fits between the lower surface of washer 69 and a counter sunk frusto-conical hole 73 in connector 14. O-ring 72 fits between the upper surface of cylinder 51 and another counter sunk frusto-conical hole 74 in connector 14. Holes 73 and 74 are connected by a bore 75. From FIG. 6, it will be noted that all the structures shown therein may vibrate, but that the amount of vibration transmitted to connector 14 may be quite small.

FIG. 7 is a perspective view of an alternative embodiment of the invention similar to the view of FIG. 3. Crystal 30 and leads 31 and 32 have been omitted from FIG. 7 for clarity. The embodiment of FIG. 7 is also different from the embodiment of FIG. 3 in two other respects. In the first place, the dividing lines 35 in FIG. 3 are not shown in FIG. 7 because FIG. 7 is a perspective view of a solid cylinder 77 which is not divided into halves. Cylinder 77 has uniform and concentric internal and external surfaces except at a groove 78 which may be identical to groove 33. As before, a vane 79 may be provided with a notch 80 to mate with groove 78. Instead of being clamped, vane 79, along each of its two longitudinal edges, is electron beam welded to cylinder 77 in an area, for example, 76.

Figure 8:
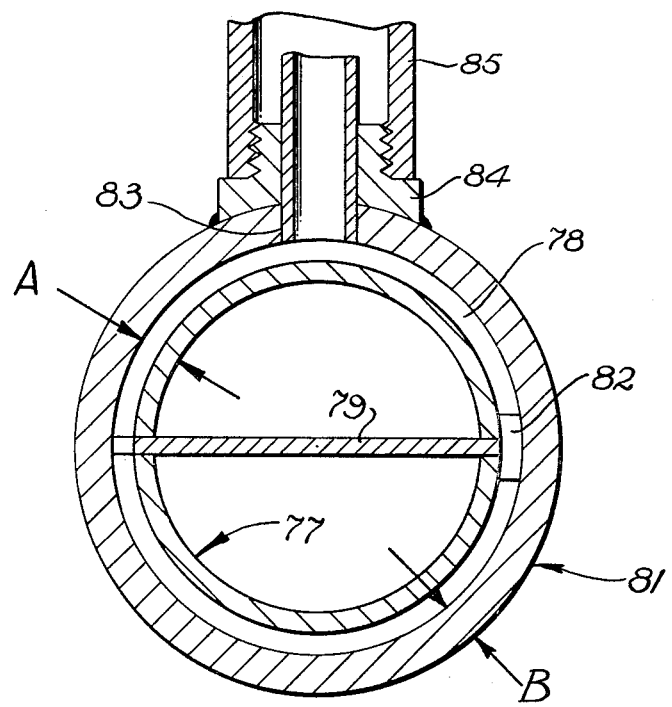
FIG. 8 is an enlarged sectional view of said alternative embodiment similar to the lower portion of FIG. 2.

As shown in FIG. 8, cylinder 77 has a compression fit inside a cylinder 81. A crystal 82 is shown in place in groove 78 between cylinder 77 and cylinder 81. Parts 83, 84 and 85 are provided which may be identical to parts 21, 36 and 23 shown in FIG. 2. The remainder of the structure and electronics which may be employed with the embodiment of FIG. 8 may be identical with that employed in connection with the embodiment of FIG. 2. For example, the electronics disclosed in said copending application may be employed with the embodiment shown both in FIG. 2 and in FIG. 8.

The wires from crystal 82 are not shown in FIG. 8 for clarity.

Note will be taken that FIG. 8 is larger than the lower portion of FIG. 2. This enlargement has been made simply for the sake of clarity. FIGS. 2 and 8, insofar as the common structure shown, may be considered identical.

As stated previously, densitometers, and especially gas densitometers of the vibration type, are normally temperature sensitive. Further, it is very difficult to determine the cause of the temperature sensitivity because it is the resonant frequency of the densitometer that determines its density indication or otherwise, and it is difficult to determine the connection between the resonant frequency and temperature or temperature induced error.

As stated previously, it would normally be expected that the best possible design would include all parts of the same material. However, this does not work.

Parts 13, 14 and 85 shown in FIG. 8 may be made of the same materials described in connection with their corresponding parts in FIG. 2. However, it has been found that both embodiments of the invention of FIGS. 2 and 8 may be made substantially temperature insensitive by employing a ratio of the thickness, B, of cylinder 81 to the thickness of cylinder 77 illustrated at A in FIG. 8 of about 100 percent. A 10 to 1 improvement is achieved when using the said thickness ratio, vane 79 and cylinder 81 are made of Ni Span C, and cylinder 77 is made of 416 stainless steel.

Substantially perfect results may be made by tailoring the said thickness ratio to between about 90 and 100 percent.

Since Ni Span C has a thermal coefficient of expansion of about $4.2 \times 10^{-6}$ inch per inch per degree Fahrenheit and 416 stainless steel has a thermal coefficient of expansion of about $5.5 \times 10^{-6}$ inch per inch per degree Fahrenheit, it will be appreciated that an outstanding feature of the invention, although unexpected, is the use of a supporting cylinder 77 for vane 79 which has a thermal coefficient of expansion larger than that of the vane. Note will be taken that this is especially unexpected. Note that the normal tendency of the vane to expand with temperature would indicate a frequency drop, and the use of a structure to support the vane having a larger thermal coefficient of expansion than that of the vane would be expected to make the frequency drop worse rather than better. It would tend to relieve whatever loading the vane takes as a column by the interference fit.

By this reference hereto, said copending application is hereby incorporated herein as though fully set forth herein.

The word "densitometer" as used herein is hereby defined to include any instrument which produces an electrical output signal in accordance with the density of a fluid. The word "densitometer" as used herein is, therefore, hereby defined to include an instrument which either indicates or does not indicate the density of a fluid. In other words, the device of the present invention may be employed to produce an electrical output signal in accordance with the density of a fluid which may be used for a control or any other purpose. For example, the densitometer of the present invention may be employed in a mass flowmeter.

The word "fixed" as used herein in describing the manner of mounting of vanes 20 and 79 is not limited to welding or clamping but is determined generic to both and any equivalents thereof.

The word "cylinder" as used herein is hereby defined to include the cylinders of both of the embodiments of FIGS. 3 and 7 and is not limited to the embodiment of FIG. 7 where cylinder 77 is made of one integral piece of metal. That is, the word "cylinder" as defined herein, also includes the cylinder of FIG. 3 which is spread into two halves.

What is claimed is:

1. A vibration densitometer probe comprising: a first member to be vibrated; a structure supporting said first member, said structure having a thermal coefficient of expansion greater than that of said member, said first member being a rectangular metal vane, said structure being a first metal cylinder, the edges of said vane being fixed relative to said first cylinder in a position such that one symmetrical axis of said vane lies in the same position as the axis of said first cylinder; and a second metal cylinder surrounding said first metal cylinder contiguous thereto, said second cylinder having a thermal coefficient of expansion less than that of said first cylinder, said vane and said second cylinder being made of the same material, said vane material being Ni Span C and said first cylinder material being 416 stainless steel.

2. The invention as defined in claim 1, wherein the ratio of the thickness of said second cylinder to that of said first cylinder is between about 90 percent to about 100 percent.

* * * * *